United States Patent
Kim (10) Patent No.: US 7,606,586 B2
(45) Date of Patent: Oct. 20, 2009

(54) METHOD AND APPARATUS FOR DELAYED TRANSMISSION OF SMS MESSAGES

(75) Inventor: Hyun-Sung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 11/387,192

(22) Filed: Mar. 22, 2006

(65) Prior Publication Data

US 2006/0234732 A1    Oct. 19, 2006

(30) Foreign Application Priority Data

Mar. 22, 2005  (KR) .................. 10-2005-0023810

(51) Int. Cl.
- H04M 1/725  (2006.01)
- H04M 1/00   (2006.01)
- H04M 3/00   (2006.01)
- H04B 7/00   (2006.01)
- H04W 4/00   (2009.01)

(52) U.S. Cl. .................. 455/466; 455/412.1; 455/514; 455/550.1; 455/556.1; 455/418

(58) Field of Classification Search ... 455/412.1–412.2, 455/433, 466, 550.1, 556.2, 566, 560–561, 455/410, 415, 418, 445, 514, 567; 370/389, 370/392, 394, 471, 473–474, 410, 412.1–412.2, 370/415, 418, 445, 466, 514, 550.1, 556.2, 370/566, 560–561, 567, 349, 395.21, 395.3, 370/395.4, 395.42, 428–429
See application file for complete search history.

(56) References Cited

U.S. PATENT DOCUMENTS 6,044,275 A * 3/2000 Boltz et al. .................. 455/466

(Continued)

FOREIGN PATENT DOCUMENTS

AU    732382 B    10/1998

(Continued)

OTHER PUBLICATIONS

"Digital Cellular Telecommunications System (Phase 2+); Universal Mobile Telecommunications System (UMTS); Technical Realization of Short Message Service (3M3) (3GPP TS 23.040 version 6.5.0 Release 6); ETSI TS 123 040" ETSI Standards, European Telecommunicating Standards Institute, Sophia-Antipo, FR., vol. 3-T2, No. V650, Sep. 2004, XP014027463, ISSN: 0000-0001.

(Continued)

*Primary Examiner*—Meless N Zewdu
(74) *Attorney, Agent, or Firm*—Lee, Hong, Degerman, Kang & Waimey (57) ABSTRACT

A method for delayed transmission of a message from a mobile terminal to a recipient over a mobile communication network is provide. The method comprises composing a message content, wherein the message content is stored in a storage medium of the mobile terminal; associating transmission information with the message content, wherein the transmission information comprises timing information for transmitting the message content to a recipient with a delay; and transmitting the transmission information and the message content to a remote message center over the mobile communication network, wherein the message content is stored in a storage medium connected to the message center for delayed transmission to the recipient in accordance with the timing information.

23 Claims, 5 Drawing Sheets

U.S. PATENT DOCUMENTS

| | | | | |
|---|---|---|---|---|
| 6,144,653 | A * | 11/2000 | Persson et al. | 370/337 |
| 6,529,717 | B1 * | 3/2003 | Blants et al. | 455/186.1 |
| 6,728,548 | B1 * | 4/2004 | Willhoff | 455/466 |
| 6,920,331 | B1 * | 7/2005 | Sim et al. | 455/466 |
| 6,944,467 | B2 * | 9/2005 | Ala-Luukko | 455/466 |
| 7,181,231 | B2 * | 2/2007 | Le Bodic et al. | 455/466 |
| 7,373,384 | B2 * | 5/2008 | Bragado Carrasco et al. | 709/206 |
| 7,433,967 | B2 * | 10/2008 | Anson et al. | 709/240 |
| 2005/0055408 | A1 | 3/2005 | Dong | |

FOREIGN PATENT DOCUMENTS

| | | |
|---|---|---|
| AU | 753358 B | 10/1998 |
| JP | 2003163953 | 6/2003 |
| JP | 2005525051 | 8/2005 |
| WO | 99/49479 | 9/1999 |
| WO | WO 99/49679 | 9/1999 |
| WO | 03/096660 | 11/2003 |

OTHER PUBLICATIONS

3GPP "Technical realization of the Short Message Service (SMS)" 3GPP TS 23.040 V6.5.0, Sep. 2004.

* cited by examiner

| b7 | b6 | b5 | b4 | b3 | b2 | b1 | b0 | |
|---|---|---|---|---|---|---|---|---|
| TP-RP | TP-UDHI | TP-SRR | \multicolumn{2}{c}{TP-VPF} | TP-RD | \multicolumn{2}{c}{TP-MTI} | 1 Octect |

| | |
|---|---|
| TP-MR | 1 Octect |
| TP-DA | 2-12 Octects |
| TP-PID | 1 Octect |
| TP-DCS | 1 Octect |
| TP-VP | 1~7 Octests |
| TP-UDL | 1 Octect |
| TP-UD | dependent on DCS |

FIG.4

| UDL | User Data Length |
|---|---|
| UDHL | User Data Header Length |
| IEI | Information Element Identifier |
| IEIDL | Information Element Identifier Data Length |
| IED | Information Element Data |
| Compressed SM | Compressed Short Message |

METHOD AND APPARATUS FOR DELAYED TRANSMISSION OF SMS MESSAGES

CROSS REFERENCE TO RELATED APPLICATIONS

Pursuant to 35 U.S.C. § 119(a), this application claims the benefit of earlier filing date and right of priority to Korean Patent Application No. 10-2005-0023810, filed on Mar. 22, 2005, the content of which is hereby incorporated by reference herein in its entirety.

FIELD OF THE INVENTION

The present invention relates to an method for delayed transmission of a SMS message, and more particularly to a method for delayed transmission of a SMS message by a mobile communication terminal over a mobile communication network.

BACKGROUND

Wireless mobile communication service providers support various mobile communication services including moving image service, voice service, and text messaging service. In text messaging service, a short messaging service (SMS) for transmission of a text message can be used to provide news, weather and stock information.

The SMS provides a bidirectional text messaging service for transmitting and receiving a short text message, even when there is a call in progress between a receiving mobile terminal and another party. The short text message can be transmitted to another party by designating a delayed transmission time using the features available on a sender's terminal.

Figure 1:
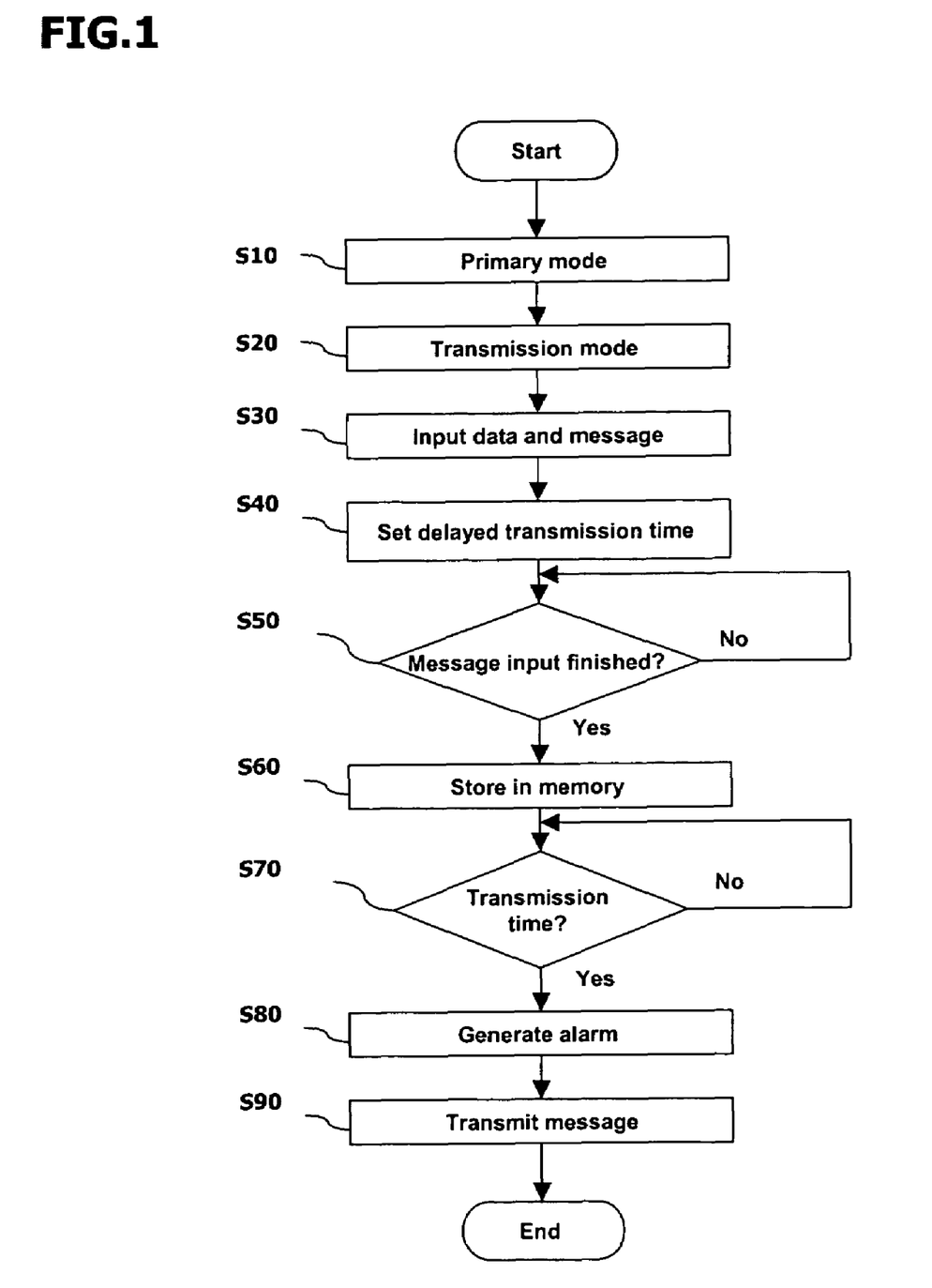
FIG. 1 is a flowchart of a method for delayed transmission of a SMS message by a mobile terminal in accordance with the related art.

FIG. 1 is a flowchart of a method for delayed transmission of a SMS message in accordance with the related art. As shown, when the mobile terminal is in a primary mode (S10), a user selects a transmission mode by interacting with the mobile terminal's user interface (S20). The user then inputs contact information (e.g., a recipient's phone number) and a text message (S30).

The user may set a delayed transmission time (S40). Once the message input is completed (S50), the message is stored in a memory of the mobile terminal (S60). Then, the mobile terminal's microprocessor compares the current time with the delayed transmission time (S70). Upon expiration of the delayed transmission time, an alarm is generated (S80) and the terminal transmits the corresponding message stored in the memory to the recipient (S90).

In the above-described conventional delayed transmission method, when the terminal is turned off or positioned in a region where mobile communication service is unavailable, the stored message cannot be transmitted. This problem arises because the message is stored locally in the terminal's memory, so if a communication connection is not available the terminal cannot send the stored message.

Systems and methods are needed that can overcome the shortcomings of the related art system.

SUMMARY OF THE INVENTION

The present invention provides an improved method for transmitting a message over short messaging service (SMS) via a mobile terminal. Accordingly, instead of storing the SMS message in a memory of the mobile terminal, the SMS message and the transmission time are transmitted to a message center so that the message delivery can be accomplished by the message center at the proper time regardless of the power or reception state of the mobile terminal transmitting the message.

To achieve these and other advantages and in accordance with the purpose of the present invention, a method for delayed transmission of a message from a mobile terminal to a recipient over a mobile communication network is provided, the method comprises: composing a message content, wherein the message content is stored in a storage medium of the mobile terminal; associating transmission information with the message content, wherein the transmission information comprises timing information for transmitting the message content to a recipient with a delay; and transmitting the transmission information and the message content to a remote message center over the mobile communication network, wherein the message content is stored in a storage medium coupled to the message center for delayed transmission to the recipient in accordance with the timing information.

In one embodiment, the message content is transmitted from the message center to the recipient, after a predefined time specified by the timing information expires. The transmission information and the message content are encapsulated into a user data header (UDH) of a short messaging service (SMS) message, for example. The encapsulation of the transmission information and the message content is represented by setting a parameter in a transfer protocol data unit (TPDU) utilized for transmitting a SMS message. Preferably, the parameter is a transfer protocol user data header indicator (TP-UDHI) of the TPDU, and an information element identifier (IEI) field of the TPDU comprises the timing information.

In one embodiment, a compressed short message (SM) field of the TPDU comprises the message content in compressed form. An information element identifier data length (IEIDL) field of the TPDU comprises information about length of the transmission information. The timing information comprises at least one of a relative transmission time and an absolute transmission time.

The relative transmission time indicates a time delay after which the message content is to be transmitted from the remote message center to the recipient, and the absolute transmission time indicates a specific time at which the message content is to be transmitted from the remote message center to the recipient.

The transmission information may further comprise an identifier, wherein a first value for the identifier indicates that the timing information represents the absolute transmission time, and a second value for the identifier indicates that the timing information represents the relative transmission time.

In accordance with another embodiment, a system for delayed transmission of a message from a mobile terminal to a recipient over a mobile communication network is provided. The system comprises a receiver configured to receive a message content and transmission information from the mobile terminal over the mobile communication network, wherein the transmission information comprises timing information for transmitting the received message content to the recipient; and a processor configured to store the message content in a storage medium coupled to the system and transmitting the message content according to timing information.

The timing information comprises at least one of a relative transmission time and an absolute transmission time, wherein the relative transmission time indicates a time delay after which the message content is to be transmitted from the remote message center to the recipient, and the absolute transmission time indicates a specific time at which the message content is to be transmitted from the remote message center to the recipient.

The transmission information further comprises an identifier, wherein a first value for the identifier indicates that the timing information represents the absolute transmission time, and a second value for the identifier indicates that the timing information represents the relative transmission time.

In yet another embodiment, an apparatus for delayed transmission of a message from a mobile terminal comprises: a module for receiving and analyzing a user data header transmitted from a mobile terminal over a mobile communication network, wherein the user data header comprises a message and transmission information; and a storage unit for storing the received message.

The message is of a type selected from the group consisting of a SMS message service message, a multimedia messaging service (MMS) message, and a long messaging service (LMS) message. The transmission information is inserted into at least one reserved information element identifier (IEI) value among IEI values of the user data header.

The module analyzes the transmission information in the user data header, and stores the message in the storage unit until the corresponding transmission time expires, in response to determining that a corresponding transmission time has been set.

The apparatus may further comprise a second storage unit, wherein the module separates messages with corresponding transmission times from messages without corresponding transmission times, such that a message without a corresponding transmission time is stored by the module in the second message storage unit for immediate transmission to the recipient.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

In accordance with one embodiment, a message using the short messaging service (SMS) may be transmitted to a recipient at a specific time after the message is composed. That is, a user instead of sending an SMS message immediately after it is composed, can set a transmission time upon the expiration of which the message is to be transmitted to a recipient. In accordance with one aspect of the invention, the transmission of the message is managed by a message center.

To accomplish the above, the content of a SMS message and the respective transmission time is included in a data packet and are transmitted to a SMS message service center (SMSC). The information in the data packet is stored in a storage medium by the SMSC. Once the transmission time expires, the SMSC transmits the message to a recipient.

Figure 2:
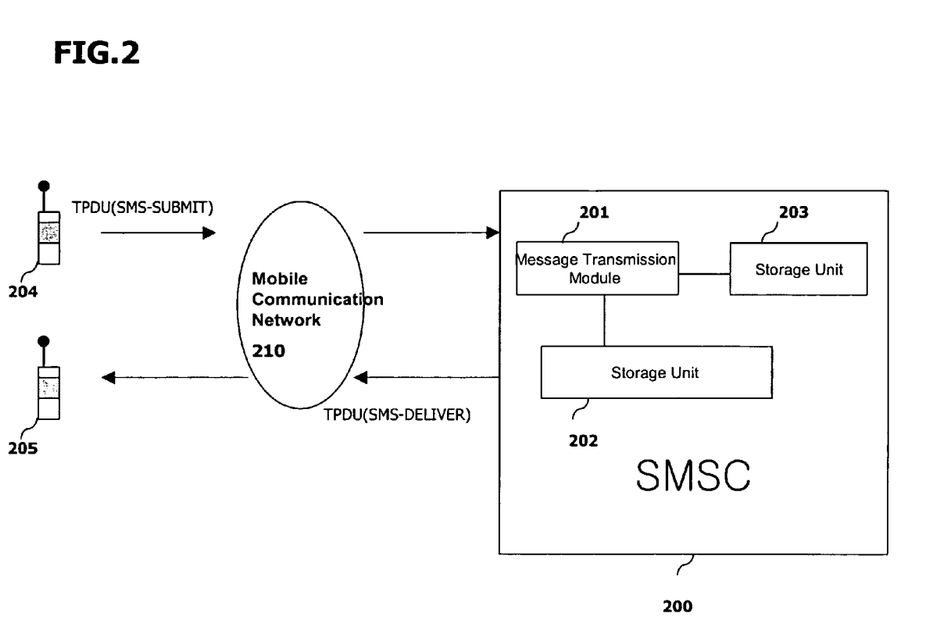
FIG. 2 is a block diagram schematically illustrating a mobile communication network environment comprising a SMS message service center (SMSC) in communication with a plurality of mobile terminals, in accordance with one embodiment.

Referring to FIG. 2, in a preferred embodiment, a terminal 204 communicates with SMSC 200 over a mobile communication network 210. A user may interact with terminal 204 to compose a SMS message and to set a transmission time. The transmission time is the time when the user would like for the message to be transmitted to a recipient. The user may, for example, provide an offset or time delay from the time of composing the message to indicate the transmission time, or alternatively provide the preferred transmission time directly.

In accordance with one embodiment, the transmission time and the message content are encapsulated into a user data header (UDH) of the SMS message and transmitted to the SMSC 200 over the SMS communication protocol. The SMSC 200 comprises a message transmission module 201 for receiving the SMS messages and analyzing the data included in the UDH. The SMCS 200 further comprises storage units 202 and 203. In a preferred embodiment, the content of the received SMS messages that are to be transmitted with a delay are stored in storage unit 203. SMS messages that are not to be delayed are stored in a buffer or a queue such as a storage unit 203.

In accordance with one aspect of the invention, SMS data is communicated between SMSC 200 and a mobile terminal 204 by way of a transfer protocol data unit (TPDU). In an exemplary embodiment, the mobile communication network 210 is developed according to the GSM communication standards (e.g., the 3$^{rd}$ Generation Partnership Project (3GPP)). The TPDU can be implemented as either an SMS-DELIVER type or an SMS-SUBMIT type. In an exemplary embodiment, on the transmitting end, a mobile terminal 204 converts a composed SMS message into an SMS-SUBMIT type TPDU. On the receiving end, the SMSC 200 converts the SMS-SUBMIT type TPDU into an SMS-DELIVER type TPDU, for example, before it is transmitted to the recipient.

Figure 3:
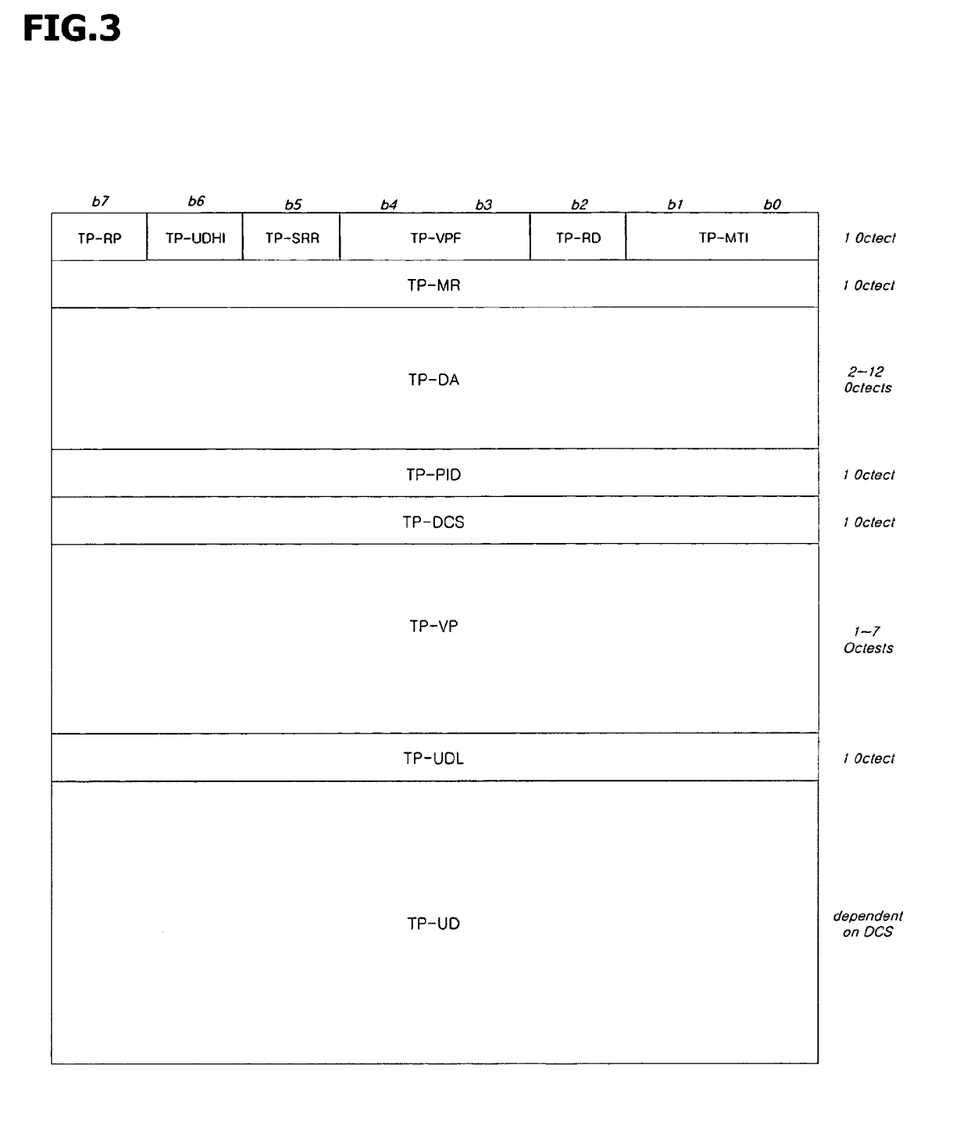
FIG. 3 is a diagram illustrating an exemplary data format for a SMS data transfer protocol, in accordance with one embodiment.

Referring to FIG. 3, an exemplary data structure for a SMS-SUBMIT type TPDU is provided. In the TPDU, a flag can be set to indicate the presence of a UDH. In a preferred embodiment, a transfer protocol user data header indicator (TP-UDHI) parameter of the TPDU is set to accomplish this task. The TPDU comprises a transfer protocol user data (TP-UD) portion reserved for carrying animation, music, and text data. In one embodiment, when a TP-UDHI is set, it is an indication that TP-UD portion of the TPDU contains a UDH.

Figure 4:
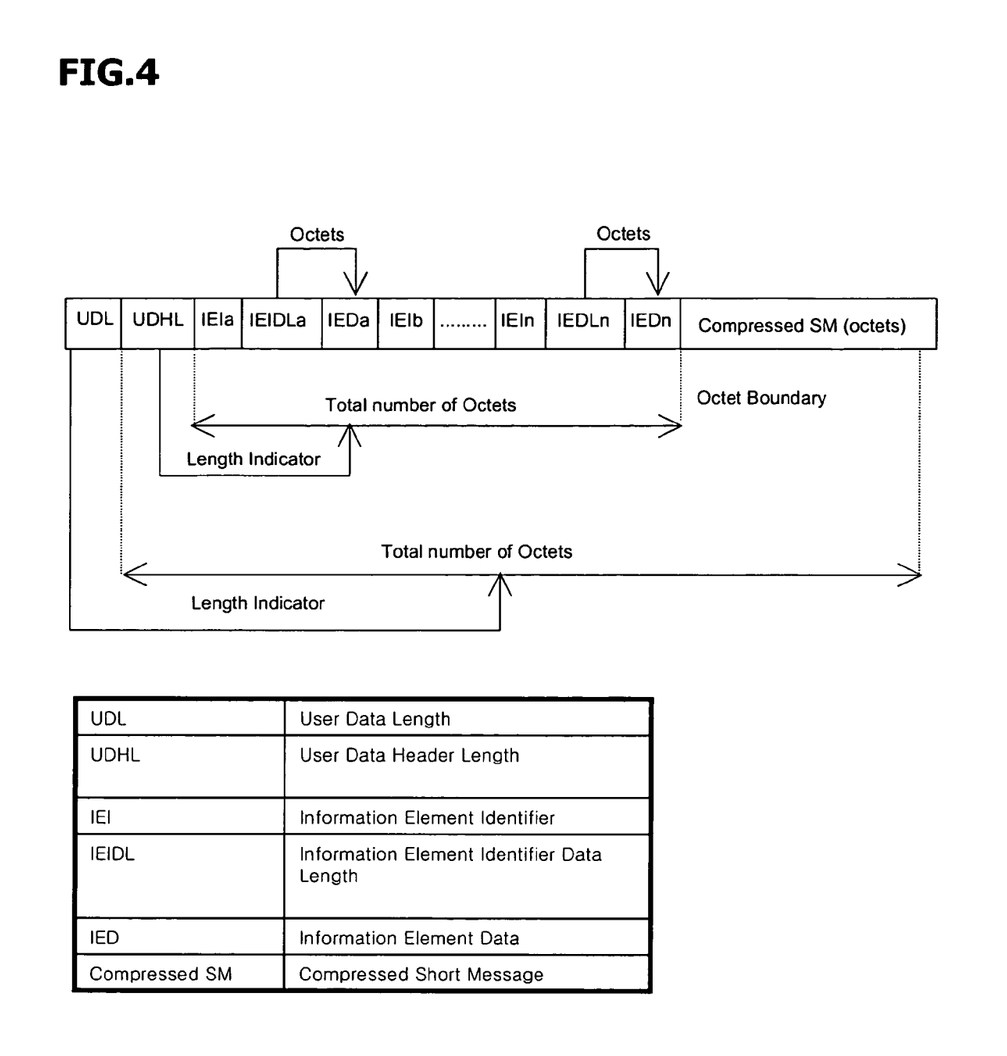
FIG. 4 is a diagram illustrating an exemplary user data header (UDH) of an SMS message, in which transmission information and message context can be encapsulated, in accordance with one embodiment.

FIG. 4 is a detailed view of the UDH as included in the TP-UD according to 3GPP specification 23.040. In this exemplary embodiment, the information element identifier (IEI)

field is used to store transmission timing information for a SMS message; and the compressed SM field is used for storing the content of the SMS message in compressed form. In a preferred embodiment, each field of the UDH has a value as defined in Table 1 below.

TABLE 1

| VALUE (hex) | MEANING | Classification | Repeatability |
|---|---|---|---|
| 0 | Concatenated short messages, 8-bit reference number | SMS Control | No |
| 1 | Special SMS Message Indication | SMS Control | Yes |
| 2 | Reserved | N/A | N/A |
| 3 | Value not used to avoid misinterpretation as <LF> character | N/A | N/A |
| 4 | Application port addressing scheme, 8 bit address | SMS Control | No |
| 5 | Application port addressing scheme, 16 bit address | SMS Control | No |
| 6 | SMSC Control Parameters | SMS Control | No |
| 7 | UDH Source Indicator | SMS Control | Yes |
| 8 | Concatenated short message, 16-bit reference number | SMS Control | No |
| 9 | Wireless Control Message Protocol | SMS Control | Note 3 |
| 0A | Text Formatting | EMS Control | Yes |
| 0B | Predefined Sound | EMS Content | Yes |
| 0C | User Defined Sound (iMelody max 128 bytes) | EMS Content | Yes |
| 0D | Predefined Animation | EMS Content | Yes |
| 0E | Large Animation (16*16 times 4 = 32*4 = 128 bytes) | EMS Content | Yes |
| 0F | Small Animation (8*8 times 4 = 8*4 = 32 bytes) | EMS Content | Yes |
| 10 | Large Picture (32*32 = 128 bytes) | EMS Content | Yes |
| 11 | Small Picture (16*16 = 32 bytes) | EMS Content | Yes |
| 12 | Variable Picture | EMS Content | Yes |
| 13 | User prompt indicator | EMS Control | Yes |
| 14 | Extended Object | EMS Content | Yes |
| 15 | Reused Extended Object | EMS Content | Yes |
| 16 | Compression Control | EMS Control | No |
| 17 | Object Distribution Indicator | EMS Control | Yes |
| 18 | Standard WVG object | EMS Content | Yes |
| 19 | Character Size WVG object | EMS Content | Yes |
| 1A | Extended Object Data Request Command | EMS Control | No |
| 1B-1F | Reserved for future EMS features (see subclause 3.10) | N/A | N/A |
| 20 | RFC 822 E-Mail Header | SMS Control | No |
| 21 | Hyperlink format element | SMS Control | Yes |
| 22 | Reply Address Element | SMS Control | No |
| 23-6F | Reserved for future use | N/A | N/A |
| 70-7F | (U)SIM Toolkit Security Headers | SMS Control | Note 1 |
| 80-9F | SME to SME specific use | SMS Control | Note 2 |
| A0-BF | Reserved for future use | N/A | N/A |
| C0-DF | SC specific use | SMS Control | Note 2 |
| E0-FF | Reserved for future use | N/A | N/A |

In a preferred embodiment, a SMS message is tagged for delayed transmission by inserting the transmission information into the information element data (IED) field. For example, one of the reserved values 2, 1B-1F, 23-6F, A0-BF, or E0-FF can be used to tag the SMS message. The transmission information may comprise a transmission time for the SMS message in addition to an identifier for identifying whether the transmission time is an absolute time (e.g., Mar. 26, 2006 at 10.00 AM) or a relative time (e.g., one hour later after the message is composed). The information element data length (IEDL) field contains information about the length of the IED.

In one embodiment, the transmission information may be inserted into the IEI fields (e.g., IEIa through IEIn). For example, let us assume that the current time is "00 seconds, 00 minutes, 14 hours, Mar. 22, 2005" and that the transmission time of a SMS message is set by the user to "00 seconds, 00 minutes, 14 hours, Mar. 23, 2005." In the above scenario, the following field values for the transmission information are respectively inserted into the IEI, IEIDL, and IED fields as provided in Table 2, below.

TABLE 2

| Field | Relative time (Hex) | Meaning | Absolute time (Hex) | Meaning |
|---|---|---|---|---|
| IEIa | 0xA0 | Reserved value of IEI values | 0x0A | Reserved value of IEI values |
| IEIDLa | 0x04 | Length of IEDa | 0x07 | Length of IEDa |
| IEDa Octet 1 | 0x00 | Relative time identifier | 0x01 | Absolute time identifier |
| Octet 2 | 0x02 | Length of Octet 3, 4 | 0x05 | Transmission Reservation time/ Corresponding year |
| Octet 3 | 0x14 | First two values from front direction of (14) relative time(1440 minutes) | 0x02 | Transmission time/ Corresponding month |
| Octet 4 | 0x40 | Second two values from back direction of (14) relative time(1440 minutes) | 0x23 | Transmission Reservation time/ Corresponding date |
| Octet 5 | | | 0x14 | Transmission Reservation time/ Corresponding hour |
| Octet 6 | | | 0x00 | Transmission Reservation time/ Corresponding minute |
| Octet 7 | | | 0x00 | Transmission Reservation time/ Corresponding second |

Where the transmission time is set as a relative time, and the transmission time (e.g., 0xA0) is selected from the IEI values of Table 1, for example, the value '0xA0' is inserted into the IEIa field. The number of octets (e.g., 0x04) denote the length of IEDa and are inserted into IEIDLa, for example. A relative time identifying value (e.g., 0x00) is inserted into the first octet of the IEDa, for example, to identify that the transmission time is set as a relative time, rather than an absolute time.

A value corresponding to the number of octets (e.g., 0x02) representing the relative time value (e.g., 1440 minutes=one day) of the transmission time are inserted into the second octet, for example. And the relative time value (e.g., 1440 minutes) of the transmission time is inserted into the third and fourth octets respectively as the values '0x14' and '0x40', for example.

Where the transmission time is set as an absolute time, the value '0xA0' is inserted into the IEIa field, and the number of octets (e.g., 0x07) corresponding to the length of the IEDa is inserted into IEIDLa, for example. An absolute time identifier value (0x01) is inserted into the first octet of the IEDa to identify that the transmission time is set as an absolute time, for example. A value (e.g., 0x05) indicating the corresponding year (e.g., 2005) of the transmission time is inserted into the second octet, for example.

A value (e.g., 0x03) indicating the corresponding month (e.g., March) of the transmission time is inserted into the third octet, for example. A value (e.g., 0x23) indicating the corresponding date (e.g., 23) of the transmission time is inserted into the fourth octet, for example. A value (e.g., 0x14) indicating the corresponding hour (e.g., 14 hours) of the transmission time is inserted into the fifth octet, for example. A value (e.g., 0x00) indicating the corresponding minute (e.g., 00 minute) of the transmission time is inserted into the sixth octet, for example. And a value (e.g., 0x00) indicating the corresponding second (e.g., 00 seconds) of the transmission time is inserted into the seventh octet, for example.

Figure 5:
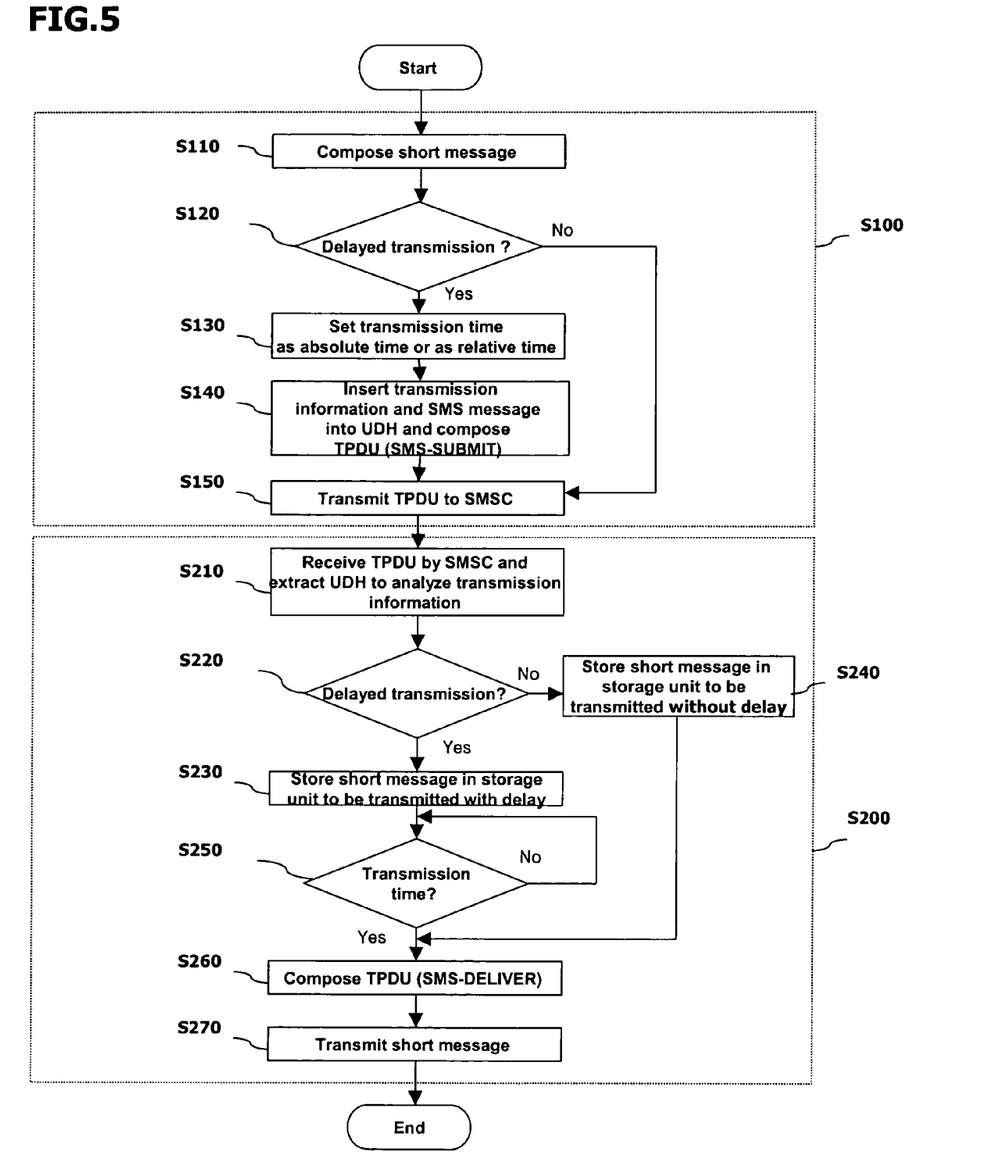
FIG. 5 is a flowchart of a method for delayed transmission of a SMS message by a mobile terminal, in accordance with one embodiment.

FIG. 5 is a flowchart showing a method for delayed transmission of a SMS message from a mobile terminal according to one embodiment of the invention. This method is based on the functionalities of the SMSC 200, the mobile terminal 204, and the aforementioned implementation of the TPDU and the UDH. The method comprises transmitting a user-composed SMS message and transmission information from a terminal 204 to an SMSC 200 (S150), analyzing the transmission information at the SMSC 200 (S210), and transmitting the SMS message to a recipient at the designated transmission time (S270).

In one embodiment, a user employs a message composing function on a mobile terminal 204 to enter a recipient's contact information (e.g., phone number) and a SMS message (S110). If the user wants to delay the transmission of the SMS message (S120), the user sets a transmission time for the composed message by designating an absolute time or a relative time (S130). The mobile terminal 204 allocates a part of the TP-UD as the UDH and inserts the transmission information into the reserved IEI values within the UDH.

The mobile terminal 204 adds the user-composed SMS message in a field (e.g., compressed SM field) of the UDH in a compressed form, thereby creating an SMS-SUBMIT TPDU (S140). Subsequently, the mobile terminal 204 transmits the SMS-SUBMIT TPDU, including the SMS message content and the transmission information to the SMSC 200 (S150).

The SMSC 200 receives the transmitted SMS-SUBMIT TPDU. The SMSC's message transmission module 201 extracts the UDH from the SMS-SUBMIT TPDU to analyze the transmission information (S210). Then, it is determined if the SMS message is to be send with or without delay (S220). If no transmission time has been set for the SMS message, the SMS message is stored in the storage unit 203 to be transmitted without delay (S240). If the SMS message is one for which a transmission time has been set, the SMS message is stored in the SMSC's storage unit 202 temporarily to be transmitted with a delay (S230).

In accordance with one embodiment, it is then determined by the SMSC's analysis module 201 if the transmission time has expired (S250). If so, the SMSC 200 writes an SMS-DELIVER TPDU for the SMS message (S260) and transmits the SMS-DELIVER TPDU to the recipient (S270). If the SMS message has a set transmission time, the corresponding transmission information may be included in the SMS-DELIVER TPDU.

The present invention has been disclosed in detail as applicable to a method for delayed transmission of a SMS message in a GSM system and according to the corresponding 3GPP communication standards. It is noteworthy, however, that the present invention can be equally applied to delayed transmission of a message in other messaging systems (e.g., email, instant messaging, etc.) and according to other communication protocols (e.g., TDMA, CDMA, WCDMA, etc.).

Additionally, the present invention can be realized not only in a wireless network environment but also in a wired network environment. Moreover, the present invention can be applied to not only a SMS message service (SMS), but also to a multimedia messaging service (MMS) or a long messaging service (LMS).

The method for delayed transmission of a SMS message according to the present invention can avoid the problems associated with the terminal being turned off or located in a remote region where service is not available. Thus, since a delayed transmission SMS message is managed by the SMSC 200, the SMS message can be reliably transmitted to the recipient at the specified transmission time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for delayed transmission of a message from a mobile terminal to a recipient over a mobile communication network, the method comprising:
   receiving, from a user, timing information for delaying transmission of the message to the recipient; and
   transmitting transmission information and message content to a remote message center over the mobile communication network, wherein the transmission information comprises the timing information, and wherein the message content is stored in a storage medium connected to the message center for transmitting to the recipient in accordance with the timing information,
   wherein the transmission information farther comprises an identifier, wherein a first value for the identifier indicates that the timing information represents an absolute transmission time, and a second value for the identifier indicates that the timing information represents a relative transmission time.

2. The method of claim 1, wherein the message content is transmitted from the message center to the recipient after a predefined time specified by the timing information expires.

3. The method of claim 1, wherein the transmission information and the message content are encapsulated into a user data header (UDH) of a short messaging service (SMS) message.

4. The method of claim 3, wherein the encapsulation of the transmission information and the message content is represented by setting a parameter in a transfer protocol data unit (TPDU) utilized for transmitting a SMS message.

5. The method of claim 4, wherein the parameter is a transfer protocol user data header indicator (TP-UDHI) of the TPDU.

6. The method of claim 5, wherein an information element identifier (IEI) field of the TPDU comprises the timing information.

7. The method of claim 5, wherein a compressed short message (SM) field of the TPDU comprises the message content in compressed form.

8. The method of claim 5, wherein an information element identifier data length (IEIDL) field of the TPDU comprises information about length of the transmission information.

9. The method of claim 1, wherein the timing information comprises at least one of the relative transmission time and the absolute transmission time, wherein the relative transmission time indicates a time delay after which the message content is to be transmitted from the remote message center to the recipient, and the absolute transmission time indicates a specific time at which the message content is to be transmitted from the remote message center to the recipient.

10. The method of claim 1, further comprising associating the transmission information with the message content, wherein the transmission information comprises the timing information for transmitting the message content to the recipient with a delay.

11. A system for delayed transmission of a message from a mobile terminal to a recipient over a mobile communication network, the system comprising:

a receiver configured to receive a message content and transmission information from the mobile terminal over the mobile communication network, wherein the transmission information comprises timing information for delaying transmission of the received message content to the recipient, and wherein the timing information is provided by a user of the mobile terminal; and     a processor configured to store the message content in a storage medium connected to the system for transmitting to the recipient according to the timing information,     wherein the transmission information further comprises an identifier, wherein a first value for the identifier indicates that the timing information represents an absolute transmission time, and a second value for the identifier indicates that the timing information represents a relative transmission time.

12. The system of claim 11, wherein the stored message content is transmitted to the recipient after a predefined time specified by the timing information expires.

13. The system of claim 11, wherein the transmission information and the message content are encapsulated into a user data header (UDH) of a short messaging service (SMS) message.

14. The system of claim 13, wherein the encapsulation of the transmission information and the message content is represented by setting a parameter in a transfer protocol data unit (TPDU) utilized for transmitting a SMS message.

15. The system of claim 14, wherein the parameter is a transfer protocol user data header indicator (TP-UDHI) of the TPDU.

16. The system of claim 14, wherein an information element identifier (IEI) field of the TPDU comprises the timing information.

17. The system of claim 14, wherein a compressed short message (SM) field of the TPDU comprises the message content in compressed form.

18. The system of claim 14, wherein an information element identifier data length (IEIDL) field of the TPDU comprises information about length of the transmission information.

19. The system of claim 11, wherein the timing information comprises at least one of the relative transmission time and the absolute transmission time, wherein the relative transmission time indicates a time delay after which the message content is to be transmitted from the remote message center to the recipient, and the absolute transmission time indicates a specific time at which the message content is to be transmitted from the remote message center to the recipient.

20. An apparatus for delayed transmission of a message received from a mobile terminal to a recipient over a mobile communication network, the apparatus comprising:

a module for analyzing a user data header included in the received message to determine whether a user of the mobile terminal has provided transmission information for delaying transmission of message content to the recipient; and     a storage unit for storing the received message to transmit to the recipient according to the transmission information,     further comprising a second storage unit, wherein the module separates messages with corresponding transmission times from messages without corresponding transmission times, such that a message without a corresponding transmission time is stored by the module in the second message storage unit for immediate transmission to the recipient.

21. The apparatus of claim 20, wherein the message is of a type selected from the group consisting of a SMS message service message, a multimedia messaging service (MMS) message, and a long messaging service (LMS) message.

22. The apparatus of claim 20, wherein the transmission information is inserted into at least one reserved information element identifier (IEI) value among IEI values of the user data header.

23. The apparatus of claim 21, wherein the module analyzes the transmission information in the user data header, and stores the message in the storage unit until the corresponding transmission time expires, in response to determining that a corresponding transmission time has been set.

* * * * *